United States Patent [19]

Elsner et al.

[11] 4,450,147

[45] May 22, 1984

[54] PROCESS FOR MAKING ALKALI METAL HYPOPHOSPHITE SOLUTIONS

[75] Inventors: Georg Elsner, Hürth-Knapsack; Hermann Hack, Erftstadt, both of Fed. Rep. of Germany

[73] Assignee: Hoechst Aktiengesellschaft, Fed. Rep. of Germany

[21] Appl. No.: 464,984

[22] Filed: Feb. 8, 1983

[30] Foreign Application Priority Data

Mar. 4, 1982 [DE] Fed. Rep. of Germany ....... 3207716

[51] Int. Cl.³ .................... C01B 25/12; C01B 25/165
[52] U.S. Cl. .................................. 423/304; 423/307
[58] Field of Search ................................ 423/304, 307

[56] References Cited

U.S. PATENT DOCUMENTS

4,265,866  5/1981  Arzoumanidis et al. ........... 423/304

FOREIGN PATENT DOCUMENTS

1247300  9/1971  United Kingdom ................ 423/304

*Primary Examiner*—Gary P. Straub
*Assistant Examiner*—Wayne A. Langel
*Attorney, Agent, or Firm*—Connolly and Hutz

[57] ABSTRACT

The disclosure relates to a process for making alkali metal hypophosphite solutions by reacting yellow phosphorus with an aqueous solution of an alkali metal hydroxide and/or carbonate. The disclosure provides more particularly for an aqueous hydrogen peroxide solution to be added to the mixture obtained by reacting the phosphorus with the alkali metal compound solution specified.

5 Claims, No Drawings

PROCESS FOR MAKING ALKALI METAL HYPOPHOSPHITE SOLUTIONS

Alkali metal hypophosphites are normally made by reacting yellow phosphorus with an alkali metal hydroxide or carbonate, hydrogen phosphide ($PH_3$, also called phosphine) being invariably obtained as a by-product (cf. DE-AS No. 11 12 054). This is $PH_3$ which is obtained in dilute form only, namely in the form of a gas mixture with hydrogen, and which is not directly of assistance in further reactions. Attempts have therefore been made to convert the $PH_3$ to $P_2O_5$ (cf. DE-PS No. 21 25 587) or oxidize it by means of a hydrogen peroxide solution (cf. U.S. Pat. No. 4,265,866).

For conversion to $P_2O_5$, it is necessary for the $PH_3$ to be subjected to scrubbing treatment with smoke gas, which is rather expensive and calls for considerable investment of capital; for oxidation, the $PH_3$ is introduced into an agitator-provided vessel and oxidized therein in a strongly acid solution of hypophosphorous acid with an aqueous $H_2O_2$-solution to hypophosphorous acid; by the addition of an alkali metal compound, the acid can be converted in customary fashion and worked up to alkali metal hypophosphite.

The treatment just described is rendered problematic by the need to provide and maintain the $H_2O_2$-containing solution inside the agitator-provided vessel under an atmosphere sufficiently inert so as to reliably prevent the $PH_3$-gas mixture from undergoing ignition.

A further difficulty which is common to the two prior processes just described resides in the fact that the highly toxic and self-ignitable nature of hydrogen phosphide makes it necessary for relatively large quantities thereof to be handled with extreme care and naturally with considerable expense.

We have now unexpectedly found that the difficulties which are associated with the production of alkali metal hypophosphite solutions by reaction of yellow phosphorus with an aqueous solution of an alkali metal hydroxide and/or carbonate, and reaction of the resulting hydrogen phosphide by-product with an aqueous solution of hydrogen peroxide, can readily be obviated by this invention which provides for the hydrogen peroxide solution to be added to the reaction mixture of phosphorus and said alkali metal compound solutions. It is preferable for the reaction mixture to have the hydrogen peroxide solution added thereto in an overall quantity sufficient for oxidizing the resulting hydrogen phosphide, and at a rate corresponding to the formation velocity of the hydrogen phosphide.

The phosphorus, alkali metal compounds and hydrogen peroxide should preferably be used in a molar ratio of about 2:1:1. It is generally good practice for the yellow phosphorus and alkali metal compound solutions to be continously introduced into a reaction vessel under inert gas and for them to be reacted while being intensively stirred at temperatures between 50° and 100° C.

The resulting reaction mixture is simultaneously admixed with the hydrogen peroxide solution which is added at a rate sufficient for the gas issuing from the reaction vessel to be just free from detectable hydrogen phosphide.

As practically no $PH_3$ escapes from the reaction mixture, the resulting reaction solution has naturally considerably more hypophosphite contained therein than those solutions which are obtained in reactions without $H_2O_2$-addition to the reaction mixture, the phosphite content increasing insignificantly only. As results, the process of this invention compares very favorably under economic and safety aspects with the processes described heretofore.

The following Examples illustrate the invention which is naturally not limited thereto.

EXAMPLE 1

500 ml water was introduced into a multi-necked flask provided with an agitator, reflux condenser, gas inlet (for $N_2$), and three dropping funnels for feeding phosphorus, sodium hydroxide solution (50 wgt% strength) and hydrogen peroxide (30 wgt % strength), respectively, and the water was heated to 80° C. The whole apparatus was scavenged with a slight stream of nitrogen, the off-gas was fed to a Bunsen burner and burnt. As soon as the reaction temperature was at 80° C., phosphorus fused in the dropping funnel was added dropwise simultaneously with sodium hydroxide solution. The reaction occurred spontaneously with distinct temperature increase. As soon as yellow coloration of the flame of the Bunsen burner indicated the appearance of $PH_3$, $H_2O_2$-solution of 30 wgt% strength was added dropwise. This was accompanied by a further distinct temperature increase so that it was necessary for the whole to be cooled so as to maintain the reaction temperature at about 90° C. The addition of hydrogen peroxide was controlled so that practically no $PH_3$ escaped as was recognizable at the flame of the Bunsen burner which assumed a scarcely visible yellow coloration. After about 30 minutes, 2 mols P, 2 mols NaOH and 1 mol $H_2O_2$ were found to have been reacted. In order to complete the reaction, the whole was heated for a further 10 minutes with agitation to 95° C. and then cooled to room temperature. A clear colorless solution was obtained; it was tested for its content of various P-compounds by nuclear magnetic resonance spectroscopy (NMR). 77% of the phosphorus was hypophosphite, 22% was phosphite and 1% was phosphate.

EXAMPLE 2

(Comparative Example)

2 mols phosphorus and 2 mols sodium hydroxide solution were reacted in an apparatus as described in Example 1. The conditions were as in Example 1 save that no hydrogen peroxide was added and that an absorption tower packed with zeolite for $PH_3$-absorption was arranged between condenser and burner. After the reaction was terminated, the reaction solution was subjected to NMR-spectroscopy. The ratio of hypophosphite to phosphite was 74:26. The quantity of hydrogen phosphide absorbed was 13 g=about 19% of phosphorus used. As results, only 58% of the phosphorus used was found to have been converted to the product desired.

We claim:

1. In the process for making alkali metal hypophosphite solutions by reacting yellow phosphorus with an aqueous alkali metal hydroxide and/or carbonate solution and reacting the resulting $PH_3$ by-product with an aqueous hydrogen peroxide solution, the improvement which comprises adding the hydrogen peroxide solution to the mixture undergoing reaction between the phosphorus and said alkali metal hydroxide and/or carbonate solution.

2. Process as claimed in claim 1, wherein the reaction mixture is admixed with the hydrogen peroxide solution in an overall quantity sufficient for oxidizing the resulting $PH_3$ and at a rate corresponding to the formation velocity of $PH_3$.

3. Process as claimed in claim 1, wherein the phosphorus, alkali metal compound and hydrogen peroxide are used in a molar ratio of 2:1:1.

4. Process as claimed in claim 1, wherein yellow phosphorus and alkali metal compound solution are introduced continuously under inert gas into a reaction vessel and reacted while being intensively mixed at temperatures between 50° and 100° C., the resulting reaction mixture being simultaneously admixed with hydrogen peroxide solution at a rate sufficient for the gas issuing from the reaction vessel to be just free from detectable $PH_3$.

5. A method for oxidizing $PH_3$ produced as a by-product of the reaction which occurs in the reaction mixture comprising yellow phosphorus and an alkaline aqueous solution, said method comprising the steps of:
adding hydrogen peroxide to said reaction mixture to oxidize the $PH_3$ substantially as it is formed in said reaction mixture, whereby substantially no $PH_3$ escapes from said reaction mixture, and
permitting alkali metal hypophosphite to form in said reaction mixture as a result of the oxidizing of the $PH_3$.

* * * * *